United States Patent
Kraft et al.

(10) Patent No.: US 9,413,866 B2
(45) Date of Patent: Aug. 9, 2016

(54) INTELLIGENT PHONE BOOK

(75) Inventors: Christian Kraft, Frederiksberg (DK); Peter Dam Nielsen, Lyngby (DK)

(73) Assignee: Nokia Technologies Oy, Espoo (FI)

( * ) Notice: Subject to any disclaimer, the term of this patent is extended or adjusted under 35 U.S.C. 154(b) by 537 days.

(21) Appl. No.: 11/618,078

(22) Filed: Dec. 29, 2006

(65) Prior Publication Data

US 2008/0161059 A1    Jul. 3, 2008

(51) Int. Cl.
*H04M 1/2745* (2006.01)
*H04M 1/56* (2006.01)
*H04M 1/725* (2006.01)

(52) U.S. Cl.
CPC .......... *H04M 1/274583* (2013.01); *H04M 1/56* (2013.01); *H04M 1/72563* (2013.01); *H04M 1/274508* (2013.01); *H04M 1/72547* (2013.01); *H04M 1/72566* (2013.01); *H04M 1/72569* (2013.01); *H04M 2250/60* (2013.01)

(58) Field of Classification Search
USPC .............. 455/418, 466, 564, 403, 414.1, 461, 455/551
See application file for complete search history.

(56) References Cited

U.S. PATENT DOCUMENTS

| 6,961,590 | B1 | 11/2005 | Toebes |
| 2005/0289180 | A1* | 12/2005 | Pabla .................... G06Q 10/109 |
| 2006/0035632 | A1 | 2/2006 | Sorvari et al. |
| 2006/0209690 | A1* | 9/2006 | Brooke ............... G06Q 10/109 370/230 |
| 2007/0116195 | A1* | 5/2007 | Thompson .............. H04L 12/58 379/67.1 |
| 2007/0206566 | A1* | 9/2007 | Bennett ......................... 370/352 |

FOREIGN PATENT DOCUMENTS

| EP | 1004957 A | 5/2000 |
| EP | 1725000 A | 11/2006 |
| JP | 2004178363 A | * 6/2004 |

OTHER PUBLICATIONS

International Search Report dated Jun. 19, 2008.
Written Opinion dated Jun. 19, 2008.
Z Launcher [online] [retrieved Jan. 6, 2016]. Retrieved from the Internet: <URL: https://www.zlauncher.com/>. (2015) 6 pages.

* cited by examiner

*Primary Examiner* — Gennadiy Tsvey
(74) *Attorney, Agent, or Firm* — Alston & Bird LLP

(57) ABSTRACT

A method including detecting a time and day that communications are made to a contact, recording the time and day communications are made for a respective communication type and presenting the contact information to a user depending on the use pattern of the contact information and the time and day communications are placed for the respective communication type.

21 Claims, 12 Drawing Sheets

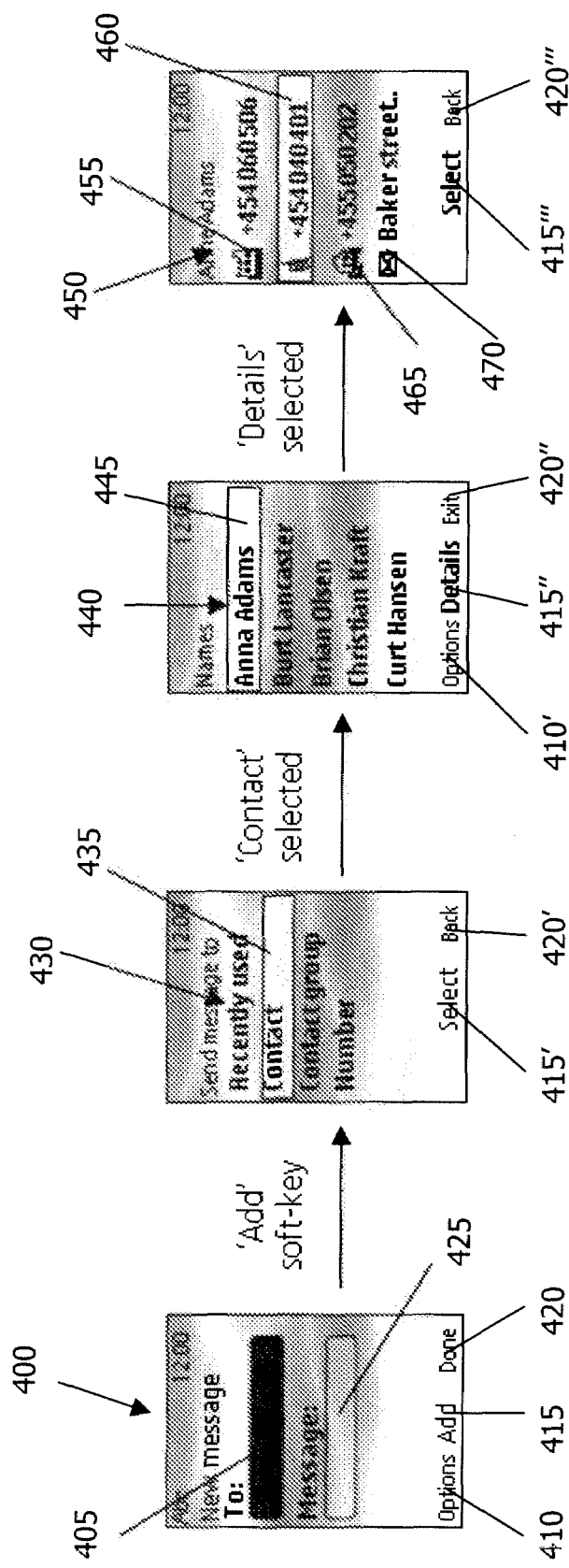

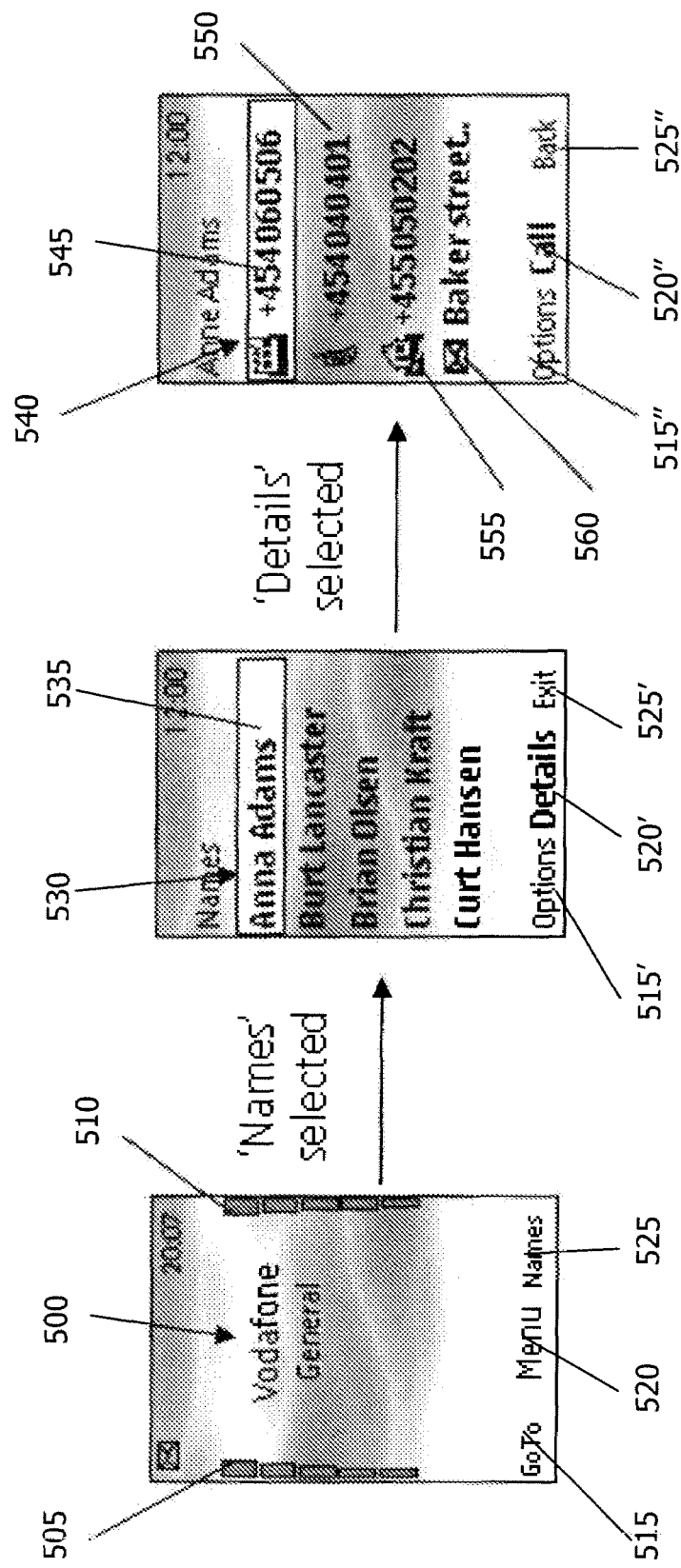

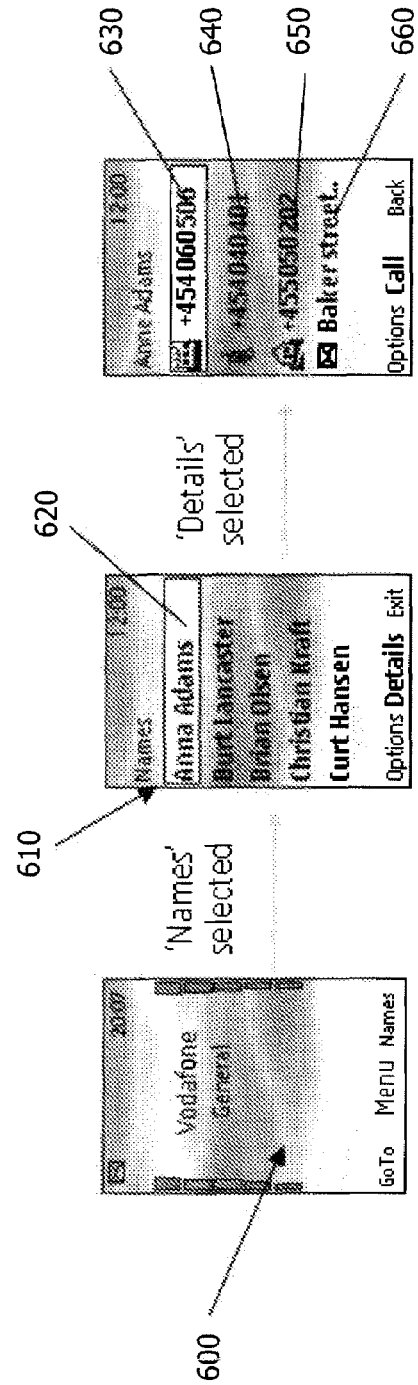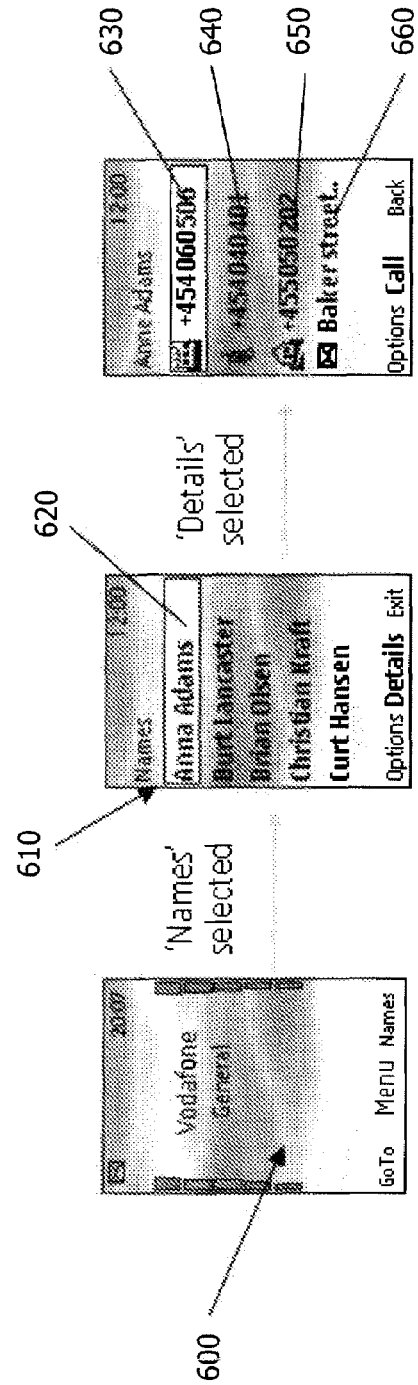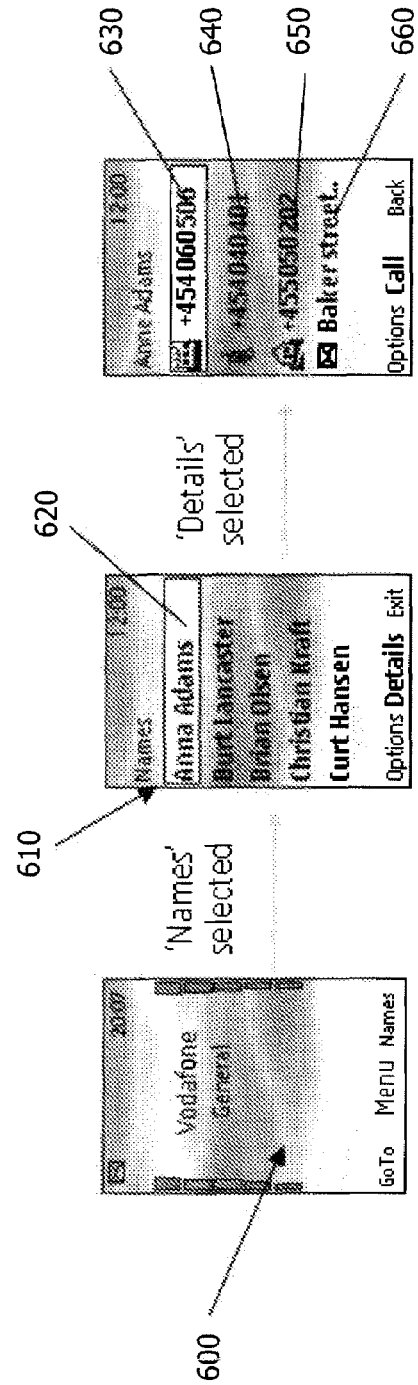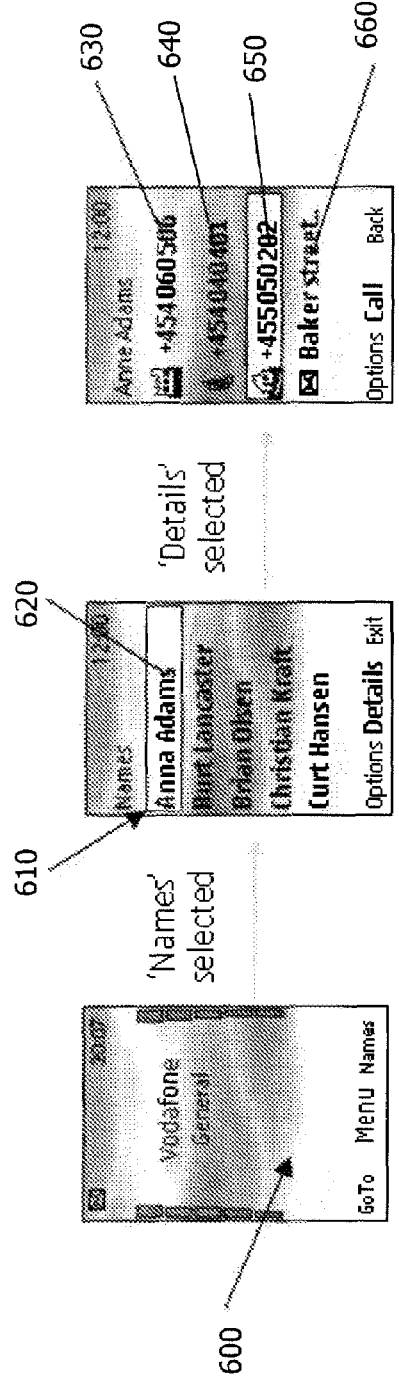
FIG. 6A FIG. 6B FIG. 6C
FIG. 7A FIG. 7B FIG. 7C

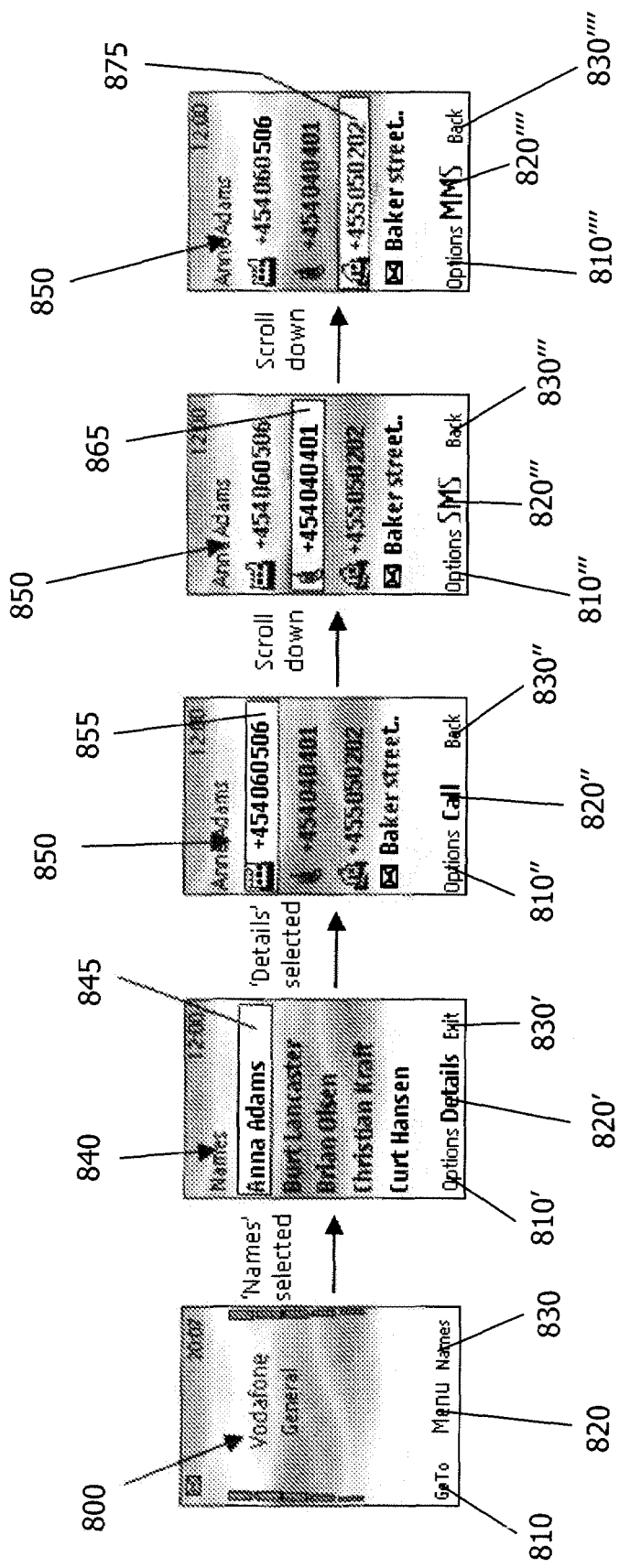

INTELLIGENT PHONE BOOK

BACKGROUND

1. Field

The disclosed embodiments relate to user interfaces and, more particularly, to user interfaces for communicating with other devices.

2. Brief Description of Related Developments

Currently mobile devices include phone books for organizing and storing their contact information. The phone book may include several entries for each contact such as, for example, a work number, a mobile device number, a home number an email address and the like. In conventional devices one of these contact numbers for a respective contact is set as the default contact number that the mobile device dials when a call is initiated to that respective contact. The default number may also be placed at the top of the contact's information when a user of the mobile device reviews the contact's details.

When the user wants to send a message such as, for example, a multimedia messaging service (MMS) or short message service (SMS) message to a contact, the number used to send the MMS or SMS may be different than the contact's default number. The number used by a user when placing a call, sending a message, etc. to contact may also depend on the contact's location at any given time of the day. When a user initiates contact with someone in the user contact list using something other than the default contact number the user has to either manually enter the number or select the number from a menu structure or phonebook of the device.

Currently, to promote a piece of contact information in communication devices with respect to a certain contact, a default number feature is used. However, this default number feature is optimized for call handling only and requires a significant amount of effort from the user of the device to set up and maintain.

It would be advantageous to automatically optimize the user's contact list depending on the type of communications the user is initiating (e.g. a call, MMS, SMS, email, etc.) and when a certain type of communication is made.

SUMMARY

In one embodiment, an apparatus is provided. The apparatus includes a communication type detection unit configured to detect a type of communication of the apparatus, a memory configured to record a use pattern of contact information for a respective communication type and a processor connected to the communication type detection unit and the memory, the processor being configured to present the contact information to a user depending on the use pattern of the contact information for the respective communication type.

In another embodiment, a method is provided. The method includes detecting a time and day that communications are made to a contact, recording the time and day communications are made for a respective communication type and presenting the contact information to a user depending on the use pattern of the contact information and the time and day communications are placed for the respective communication type.

In one embodiment, a computer program product is provided. The computer program product includes a computer useable medium having computer readable code means embodied therein for causing a computer to present contact information. The computer readable code means in the computer program product includes computer readable program code means for causing a computer to identify a communication type, computer readable program code means for causing a computer to record a use pattern of a contact information for initiating communication through the communication type and computer readable program code means for causing a computer to present the contact information to a user depending on the use pattern of the contact information.

BRIEF DESCRIPTION OF THE DRAWINGS

The foregoing aspects and other features of the disclosed embodiments are explained in the following description, taken in connection with the accompanying drawings, wherein:

FIGS. 4A-4D are screen shots of examples of a user interface in accordance with an embodiment;

FIGS. 5A-5C are screen shots of examples of a user interface in accordance with an embodiment;

FIGS. 6A-6C are screen shots of examples of a user interface incorporating features an embodiment;

FIGS. 7A-7C are screen shots of examples of a user interface incorporating features an embodiment; and FIGS. 8A-8E are screen shots of examples of a user interface in accordance with an embodiment.

DETAILED DESCRIPTION OF THE EXEMPLARY EMBODIMENT(S)

Figure 1:
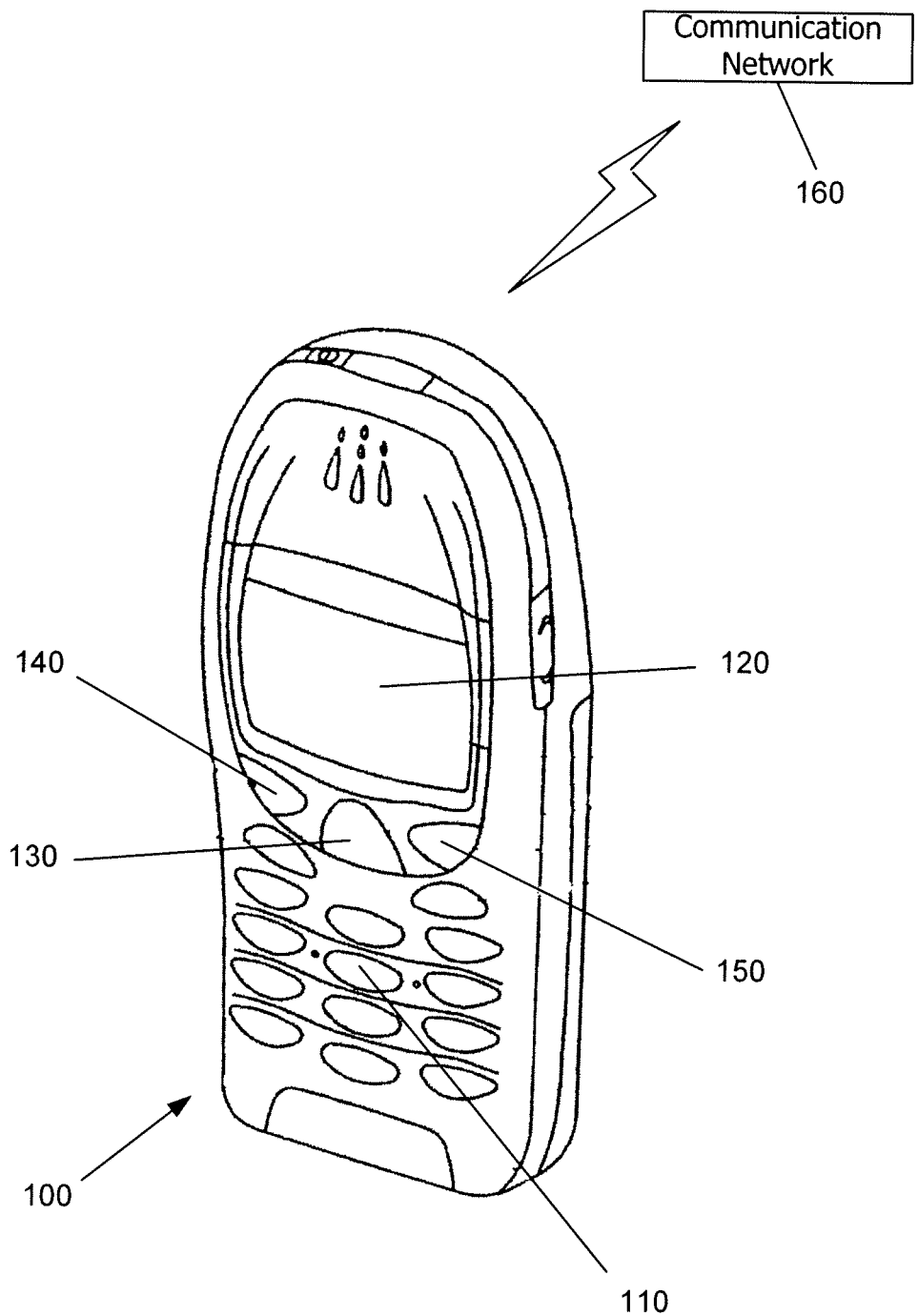
FIG. 1 illustrates a device in which aspects of the disclosed embodiments may be employed.

FIG. 1 shows a communication device 100 in which aspects of the disclosed embodiments may be implemented. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

The communication device 100 may be any suitable communication device such as, for example a personal communicator, a tablet computer, a laptop or desktop computer, a television or television set top box or any other suitable device. In this example, the device 100 includes a keypad 110, a display 120, a multi-function/scroll key 130 and left and right soft keys 140, 150 respectively. The device may enable a user to communicate with other devices such as, for example, mobile communication devices, laptop computers, desktop computers and the like over the communication network 160.

To contact other devices the user of device 100 may enter a contact number or email address into the device in any suitable manner such as, for example, the keypad 110, a pointer on a touch screen display or the user may select the contact number or email address from a contact list. However, manually entering contact information or searching for the correct contact number can be cumbersome to a user. Rather than manually entering information or keeping multiple contact lists, in accordance with the disclosed embodiments, to aid the user in entering the contact information before placing a call or sending a message the contact list (e.g. phone book) may be organized to associate a certain piece of contact information with, for example any suitable attribute associated with that contact. In alternate embodiments, the information in the contact list may be organized in any suitable manner.

Aspects of the disclosed embodiments may decrease the need for default contact information support within the device 100 as the device 100 would propose the most likely used number for a certain type of communication. Aspects of the disclosed embodiments may also allow for the optimization of all communication types whereas default contact support is optimized for call handling only. The disclosed embodiments may also increase the usability of the device 100 by simplifying the communication process via a reduction in the amount of options pertaining to a user's contact list.

Although the embodiments disclosed herein will be described with reference to the communication device 100 for exemplary purposes only, it should be understood that the embodiments could be applied equally to any suitable device incorporating, for example, a display, processor, memory and supporting software or hardware for implementing the disclosed embodiments.

Figure 2:
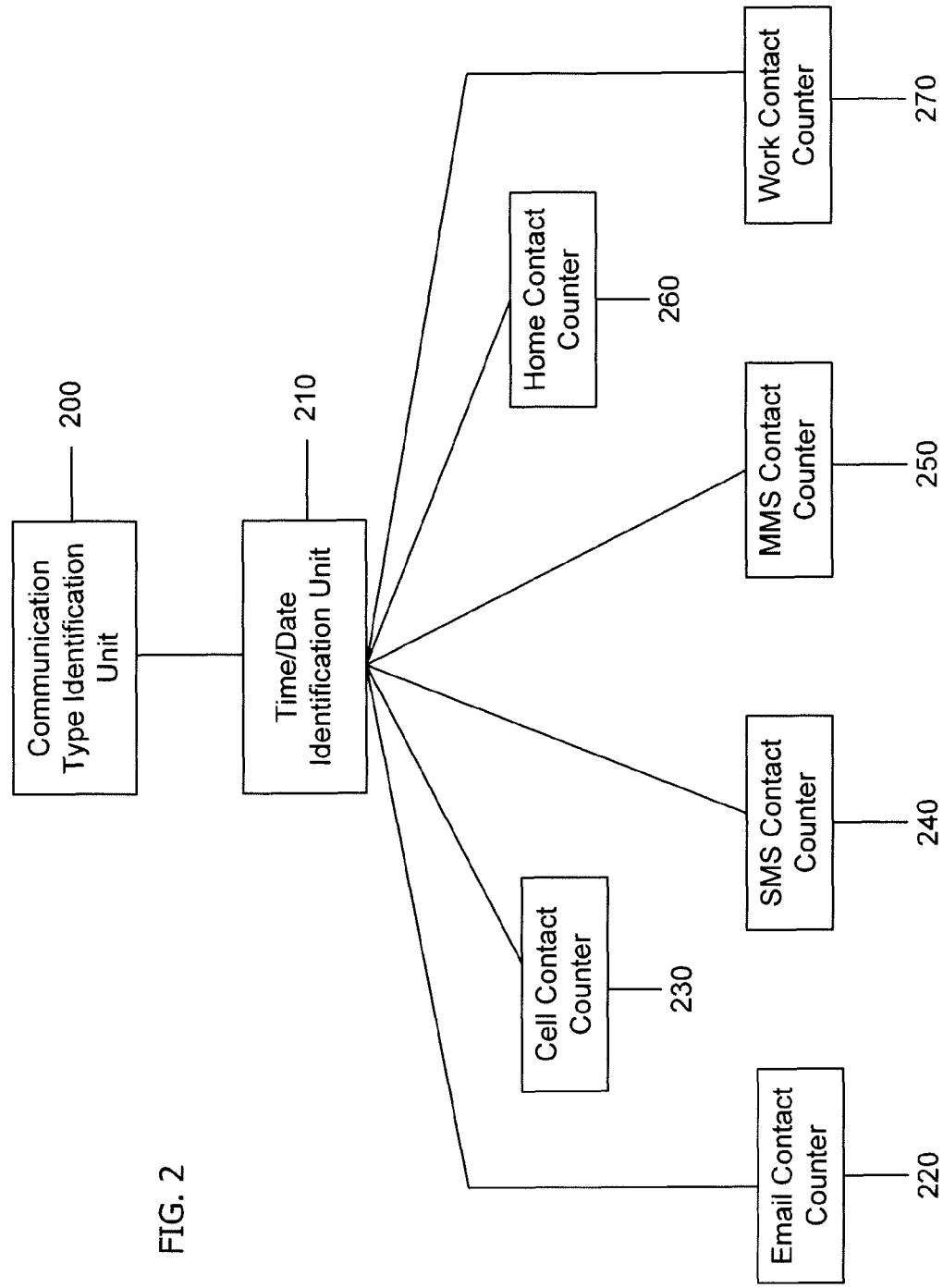
FIG. 2 is schematic illustration of an embodiment.
Figure 3:
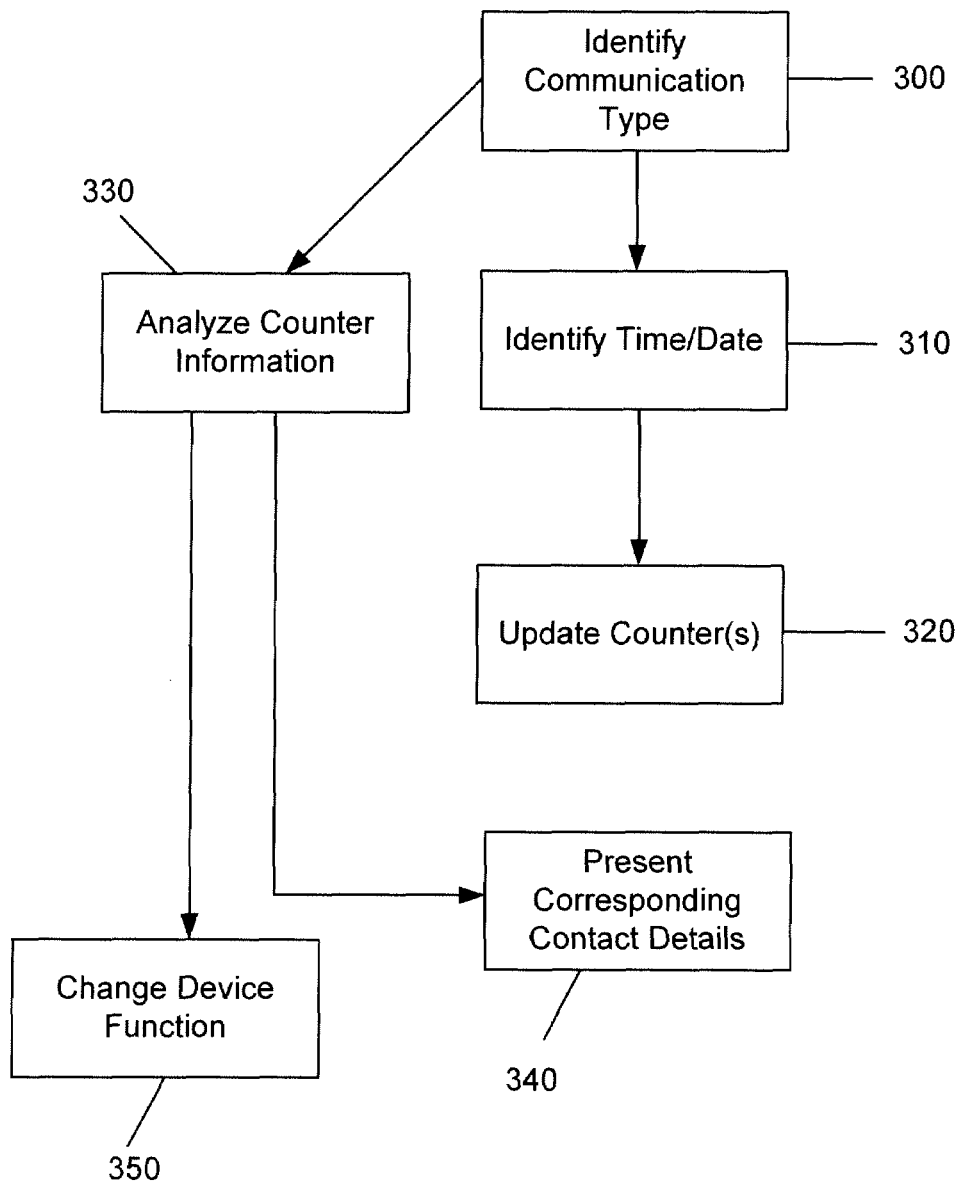
FIG. 3 is a flow diagram in accordance with an embodiment.

Referring now to FIG. 2, the device 100 may include any suitable software or hardware for identifying and storing information related to each of the contacts from a contact list in the device 100. For each communication the device 100 may be configured to cause records to be kept for the respective contact to which the communication was made. For example, a memory of the device 100 may include, for each contact, respective counters 220-270 for each type of communication method used to communicate with that contact. In this example the memory may include an email counter 220, a cell counter 230, a SMS counter 240, a MMS counter 250, a home counter 260 and a work counter 270. In alternate embodiments the device 100 may be configured to include any suitable number and/or type of counters. As the user places calls to, for example, contact "A" a communication identification unit 200 may identify the communication type (e.g. email, SMS, MMS, cell phone communication, call to contact A's place of work, call to contact A's home, business card communication and the like) (FIG. 3, Block 300). A time/date identification unit 210 may identify the time and date (e.g. day of the week/month/year etc) that the communication is being made (FIG. 3, Block 310). Depending on the type of communication a respective counter may be updated (FIG. 3, Block 320). For example, if the user of device 100 places a call to contact "A's" place of work the counter 270 may be updated to record the number of times user "A's" place of work has been called, the time of day the calls took place, the day of the week/month/year the calls took place or any other suitable information pertaining to the communication. Similar updates may be made to each of the other counters 220-260 as the user of device 100 initiates communication via the respective communication method. In alternate embodiments, the information pertaining to the communications may be recorded in any suitable manner such as, for example, through tables and the like.

The device 100 may be configured such as through, any suitable processor or an analysis unit, to analyze the information included in each of the counters for a respective contact and optimize or organize the user's contact list in any suitable manner, such as for example in a context sensitive manner.

For example, the contact list may be optimized according to the type of communication method being used by the user of device 100. Referring to FIGS. 4A-4D, screen shots of examples of a user interface in accordance with an embodiment are shown. In FIG. 4A a screen shot pertaining to sending any suitable message such as, for example, an MMS or SMS message is shown. In alternate embodiments, the SMS, MMS and other messaging features may be combined into a single user interface rather than having separate interfaces for each message type. The screen shot may represent the message user interface 400 shown on, for example, the display 120 of the device 100. The message interface 400 may include block 405 for adding message recipients (e.g. contacts) and block 425 for the body or text of the message. In other embodiments, the message interface 400 may have any suitable entry blocks such, as for example, a block for adding attachments. The message interface 400 may also include any suitable soft key functions such as, for example, an options function 410, an add function 415 and a done function 420. The options function 41000 may present to a user of the device 100 with any suitable options. The "add" function 415 may allow the user to add recipients to the "To" block 405. The done function 420 may allow the user to, for example, send the message, store the message for sending at a later time or have any other suitable function.

In this example, the user may select the communication type, such as, for example, the short message shown in FIG. 4A. The user may enter the body of the message and select one or more recipients of that message from the user's contact list. In this example the user selects the "add" soft key function 415 so that the "send message to" menu 430 appears on the display 120 of the device 100. The user may scroll through the menu 430 using for example, any suitable controls of the device 100 such as for example the scroll key 130 or a pointer on a touch enabled screen of the device. It is noted that as the user progresses from screen to screen the soft key functions 410, 415, 420, 415', 420', 410', 415", 420", 415''', 420''' change according to the menu presented. The user may select the contact menu option 435 via the soft key function 415' so that the contact list 440 appears on the display 120 of the device 100. The user may scroll through the contact list and select a name from the contact list such as, for example, the name "Anna Adams" via the details soft key function 415". The selected name may be highlight 445 in any suitable manner to indicate to the user which name is being selected. When the contact is selected the respective contact information 450 may be presented on the display 120 of the device 100. In this example, for the contact Anna Adams a work number 455, a cell number 460, a home number 465 and an email address 470 are displayed. The device may analyze the information in the respective counters for Anna Adams and determine that for the short message communication type (SMS) the cell number 460 is used most often for short messaging (FIG. 3, Block 330). Because the cell number 460 is the most use number for sending an SMS message to Anna Adams the cell number 460 may be highlighted for selection by the user rather than the first number in the details menu 450 which is usually the default selection (FIG. 3, Block 340). In alternate embodiments the cell number 460 may be moved to the top of the details menu 450. In other alternate embodiments, the most often used number may be presented in any suitable manner including, but not limited to, presenting the most used number on a screen by itself. The user may select the highlighted number 460 in any suitable manner such as, for example, via the select soft key function 415''' without scrolling through the details menu 450.

In other examples, when the user places a call to Anna Adams the information in the respective counters may be analyzed by the device to determine the most used communication type for placing a call. If for example the work number 455 is the most used number for placing a call the device will highlight the work number 455 in the details menu 450. Likewise if it is determined that the home number 465 is the most used number for placing a call the home number 465 may be highlighted in the details menu 450. A similar analysis may take place with respect to any suitable communication type (SMS, MMS, email, call, etc.) available in the device 100.

In another example, the device 100 may be in an idle mode so that an idle screen 500 is displayed on the device as can be seen in FIG. 5A. The idle screen 500 may include a signal strength indicator 505, a battery indicator 510 and soft key functions 515, 520, 525. The device may be configured so that when a user initiates communication from the idle screen 500, the device assumes that a call is to be placed (FIG. 3, Block 300). In other embodiments, the device 100 may be configured so that any suitable communication type of the device 100 is the default communication type when a communication is initiated from the idle mode. As can be seen in FIGS. 5A-5C the user may activate the contact list 530 by selecting for example the soft key function 525. In alternate embodiments the contact list may be activated in any suitable manner from any suitable mode of the device. It is noted that as the user progresses from screen to screen the soft key functions 515, 520, 525, 515', 520', 525', 515'', 520'', 525'' change according to the menu presented. The user may scroll through the contact list in any suitable manner and select a name from the contact list such as, for example, the name "Anna Adams" via the details soft key function 520'. The selected name may be highlight 535 in any suitable manner to indicate to the user which name is being selected. When the contact is selected the contact details 540 of that contact may be presented on the display 120 of the device 100. In this example, for the contact Anna Adams a work number 545, a cell number 550, a home number 555 and an email address 560 are displayed. The device may analyze the information in the respective counters for Anna Adams and determine that for the call communication type the work number 545 is used most often used (FIG. 3, Block 330). Because the work number 545 is the most use number for placing a call to Anna Adams the work number 545 may be highlighted for selection by the user (FIG. 3, Block 340) as described above with respect to FIG. 4D. The user may select the highlighted number 545 via the call soft key function 520'' without scrolling through the details menu 540.

In accordance with another embodiment, the contact list may be optimized or organized to correspond to a time or date of a communication. Referring to FIGS. 6A-6C the user of device 100 may want to place a call to Anna Adams. In alternate embodiments any suitable type of communication may be initiated. FIG. 6A illustrates a screen shot of an idle mode 600 of the device 100 from which the call is initiated as described above with respect to FIGS. 5A-5C. In alternate embodiments, the call may be initiated in any suitable manner from any suitable mode of the device. In FIGS. 6A-6C the user is placing the call between, for example, 8:00 a.m. and 5:00 p.m. (e.g. during the hours Anna Adams is at work). As described above the device 100 may identify that a call is being placed (FIG. 3, Block 300). The user may select the highlighted name 620, which in this example is Anna Adams, from the contact list 610. The device may analyze the corresponding counters (FIG. 3, Block 330) and determine that between the hours of 8:00 a.m. and 5:00 p.m. the most often communication with Anna Adams is made through the work number 630. The device may present the details for Anna Adams which include the work number 630, a cell number 640, a home number 650 and an email address 660. Because the work number 630 is the most often used number for contacting Anna during the hours of 8:00 a.m. and 5:00 p.m. the device may highlight the work number 630 in the details menu shown in FIG. 6C (FIG. 3, Block 340). The user may select the highlighted number 630 via the call soft key function without scrolling through the details menu.

In another example as can be seen in FIGS. 7A-7C the user is placing the call between, for example, 5:00 p.m. and 8:00 a.m. (e.g. during the hours Anna Adams is not at work). As described above the device 100 may identify that a call is being placed (FIG. 3, Block 300). The user may select the highlighted name 620, which in this example is Anna Adams, from the contact list 610. The device may analyze the corresponding counters (FIG. 3, Block 330) and determine that between the hours of 5:00 p.m. and 8:00 a.m. the most often communication with Anna Adams is made through the home number 650. Because the home number 650 is the most often used number for contacting Anna during the hours of 5:00 p.m. and 8:00 a.m. the device may highlight the home number 650 in the details menu shown in FIG. 7C (FIG. 3, Block 340). The user may select the highlighted number 630 via the call soft key function without scrolling through the details menu.

In other embodiments, the day, week or month in which the call is placed may also be used optimize the contact list. For example, the call placed in FIGS. 6A-6C may be made between Monday and Friday (e.g. the work week). However, if the call was placed on a Saturday or Sunday the device 100 may determine that the work number is not the most used number on the weekends. Rather, it may be determined that the cell phone number 640 is the most used number for contacting Anna on the weekends.

In another embodiment there may be dynamic soft key options corresponding to a particular entry in the contact's details. For example, Referring to FIGS. 8A-8E, the communication may be initiated from the idle screen 800 as described above via for example the soft key 830. In alternate embodiments the call may be initiated in any suitable manner from any suitable mode of the device 100. It is noted that as the user progresses from screen to screen the soft key functions 810, 820, 830, 810', 820', 830', 810'', 820'', 830'', 810''', 820''', 830''', 810'''', 820'''', 830'''' change according to the menu presented.

The user may scroll through or otherwise select a highlighted entry 845 from the contact list 840. In this example, the contact Anna Adams is selected via, for example, the soft key function 820'. In alternate embodiments the contact may be selected in any suitable manner such as for example by pressing any suitable key on the device or with a pointer on a touch enabled screen of the device. When the details 850 for the contact are displayed the user may scroll through the details 850 in any suitable manner to highlight a particular entry from details list. In accordance with an embodiment, any suitable soft key functions change depending on the detail entry being highlighted. For example, in FIG. 8C when the work number 855 is highlighted the soft key function 820'' is changed to represent a call function of the device. In this example, the device may identify the highlighted details entry (FIG. 3, Block 300). The device may analyze the counter information to determine the most used communication method for the highlighted entry (FIG. 3, Block 330) which in this example is the call function. The device may cause the soft key function to change to represent the most used communication method for the respective highlighted entry (FIG. 3, Block 350). As can be seen in FIG. 8D when the user scrolls to the cell phone entry 865 of the details list 850 the soft key function 820''' changes to an SMS communication function of the device 100. The SMS communication type may represent the most used communication type for the cell phone number 865. In FIG. 8E when the home number 875 is highlighted the soft key 820'''' changes to represent an MMS communication function of the device. The MMS communication type may represent the most used communication type with respect to the home number 875.

The embodiments described above may be employed individually or in any suitable combination. For example, the dynamic soft key function may also be time/date sensitive as described above with respect to FIGS. 6A-C and 7A-C. It is also noted that the communication types associated with a respective detail entry may be dynamic in that as the user's communication habits (e.g. the usage patterns of the device) change the communication types change as well. For example, referring back to FIG. 8, the user may begin placing calls to the home number 875 rather than MMS messages. The device 100 may determine from the usage patterns that the call communication type is the most used communication type for the home number 875 and change the soft key function 820'''' from the MMS function to a call function. It is also noted that in the disclosed embodiments the user has the option of not selecting the communication type or detail entry presented to it by the device 100. For example, referring to FIG. 4, when the details menu 450 is displayed the user may use any suitable controls of the device to select any other suitable detail entry 455, 465, 470 instead of the cell phone entry 460, which was determined by the device 100 to be the most used number for the message type communication. There may also be any suitable settings menu pertaining to the disclosed embodiments that may enable the user to specify which type(s) of contact list optimization are to be employed. For example, the user may select that the contact list is to be optimized using the dynamic soft keys combined with a time/date sensitivity. In other embodiments the user may select the most frequently used numbers to optimize the contact list.

Figure 9:
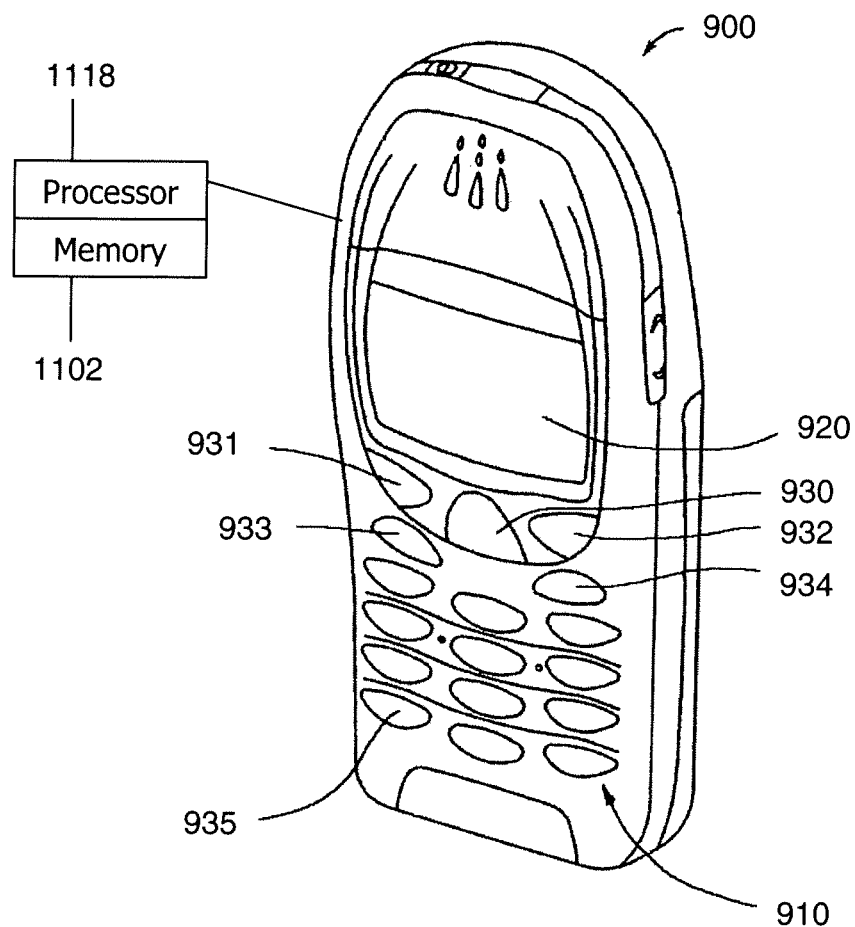
FIG. 9 shows a device incorporating features of an embodiment.

One embodiment of a device in which the disclosed embodiments may be employed is illustrated in FIG. 9. The device may be any suitable device such as terminal or mobile communications device 900. The terminal 900 may have a keypad 910 and a display 920. The keypad 910 may include any suitable user input devices such as, for example, a multi-function/scroll key 930, soft keys 931, 932, a call key 933 and end call key 934 and alphanumeric keys 935. The display 920 may be any suitable display, such as for example, a touch screen display or graphical user interface. The display may be integral to the device 900 or the display may be a peripheral display connected to the device 900. A pointing device, such as for example, a stylus, pen or simply the user's finger may be used with the display 920. In alternate embodiments any suitable pointing device may be used. In other alternate embodiments, the display may be a conventional display. The device 900 may also include other suitable features such as, for example, a camera, loud speaker, connectivity port or tactile feedback features. The mobile communications device may have a processor 1118 connected to the display for processing user inputs and displaying information on the display 920. A memory 1102 may be connected to the processor 1118 for storing any suitable information and/or applications associated with the mobile communications device 900 such as phone book entries, calendar entries, web browser, etc.

Figure 10:
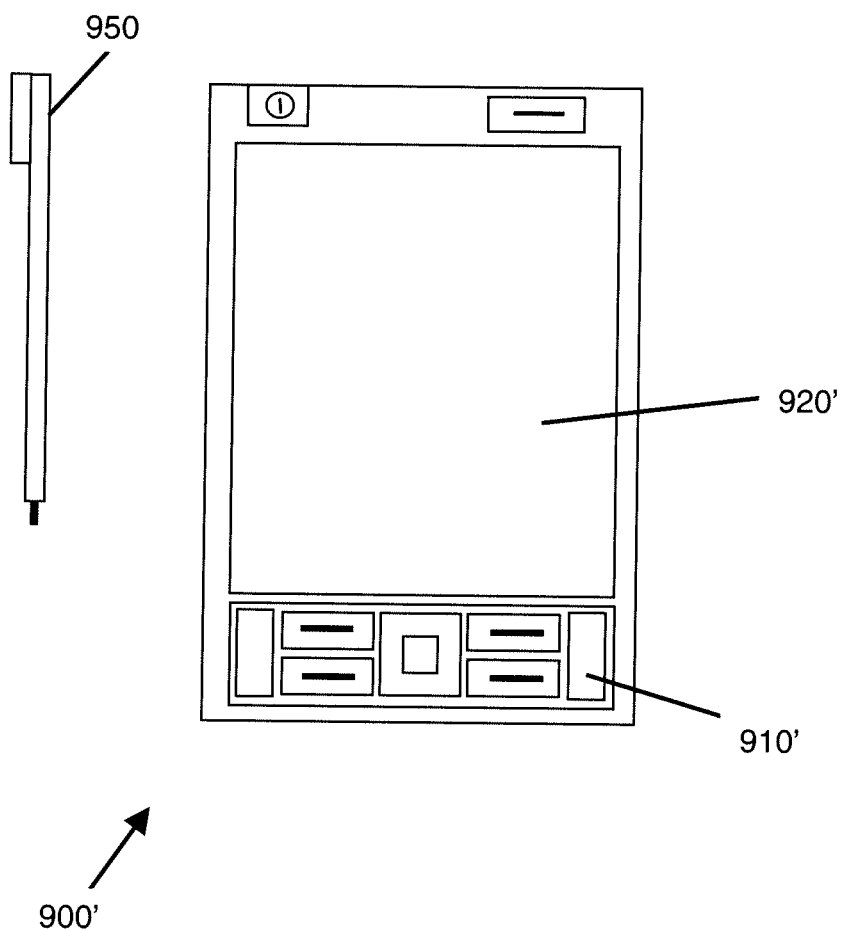
FIG. 10 shows another device incorporating features of an embodiment.

In one embodiment, the device, may be for example, a PDA style device 900' illustrated in FIG. 10. The PDA 900' may have a keypad 910', a touch screen display 920' and a pointing device 950 for use on the touch screen display 920'. In still other alternate embodiments, the device may be a personal communicator, a tablet computer, a laptop or desktop computer, a television or television set top box or any other suitable device capable of containing the display 920 and supported electronics such as the processor 1118 and memory 1102.

Figure 11:
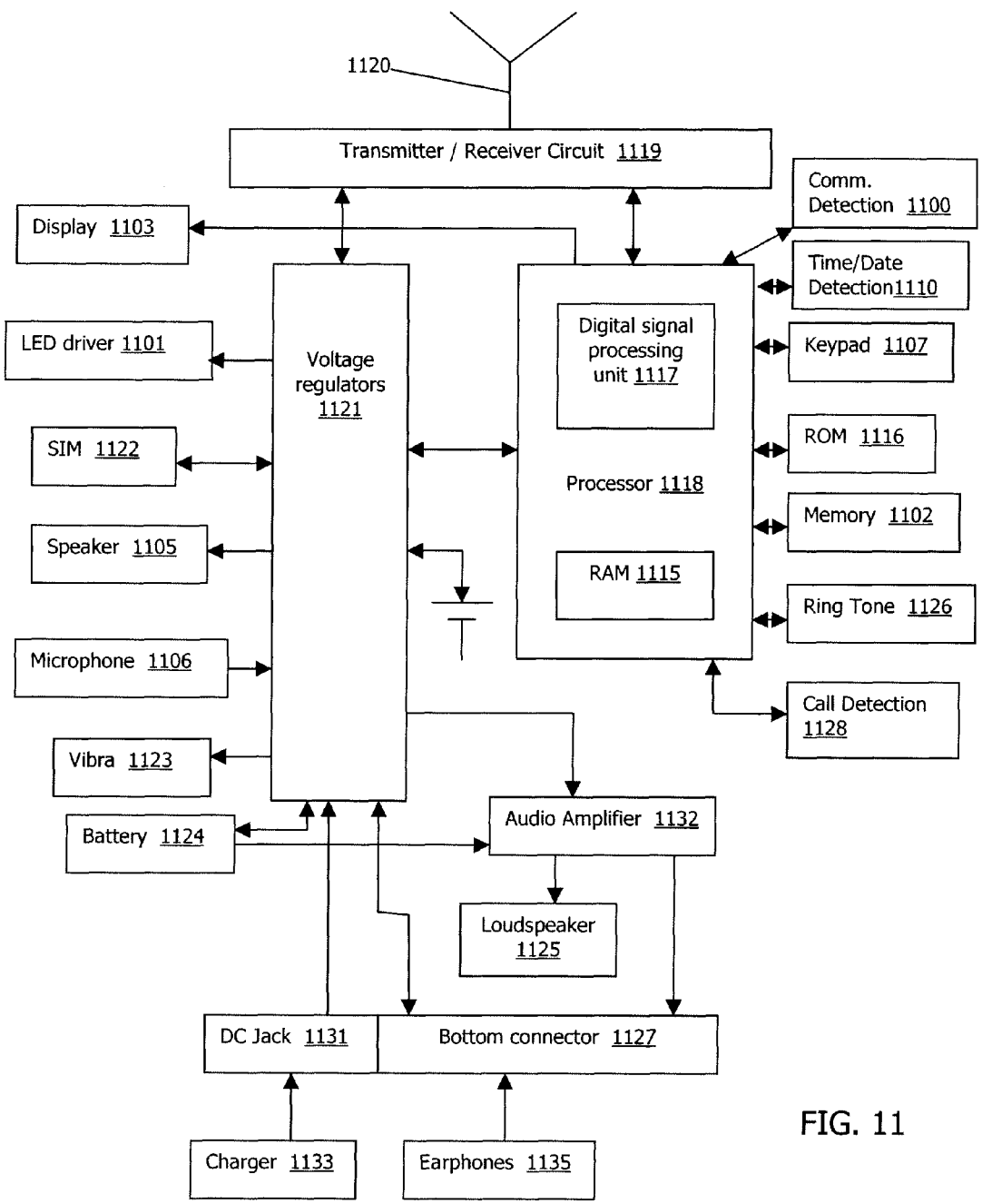
FIG. 11 is a block diagram illustrating the general architecture of an exemplary mobile device in which aspects of an embodiment may be employed.

FIG. 11 illustrates in block diagram form one embodiment of a general architecture of the mobile devices 900. The mobile communications device may have a processor 1118 connected to the display 1103 for processing user inputs and displaying information on the display 1103. The processor 1118 controls the operation of the device and can have an integrated digital signal processor 1117 and an integrated RAM 1115. The processor 1118 controls the communication with a cellular network via a transmitter/receiver circuit 1119 and an antenna 1120. A microphone 1106 is coupled to the processor 1118 via voltage regulators 1121 that transform the user's speech into analog signals. The analog signals formed are A/D converted in an A/D converter (not shown) before the speech is encoded in the DSP 1117 that is included in the processor 1118. The encoded speech signal is transferred to the processor 1118, which e.g. supports, for example, the GSM terminal software. The digital signal-processing unit 1117 speech-decodes the signal, which is transferred from the processor 1118 to the speaker 1105 via a D/A converter (not shown).

The voltage regulators 1121 form the interface for the speaker 1105, the microphone 1106, the LED drivers 1101 (for the LEDS backlighting the keypad 1107 and the display 1103), the SIM card 1122, vibration unit 1123, battery 1124, the bottom connector 1127 for connecting to the earphones 1135, the DC jack 1131 (for connecting to the charger 1133) and the audio amplifier 1132 that drives the (hands-free) loudspeaker 1125.

A processor 1118 can also include memory 1102 for storing any suitable information and/or applications associated with the mobile communications device 900 such as phone book entries, calendar entries, etc.

The processor 1118 also forms the interface for peripheral units of the device, such as for example, a (Flash) ROM memory 1116, the graphical display 1103, the keypad 1107, a ringing tone selection unit 1126, an incoming call detection unit 1128, the communication type detection unit 1100 and a time/date detection unit 1110. These peripherals may be hardware or software implemented. In alternate embodiments, any suitable peripheral units for the device can be included.

The software in the RAM 1115 and/or in the flash ROM 1116 contains instructions for the processor 1118 to perform a plurality of different applications and functions such as, for example, those described herein.

Figure 12:
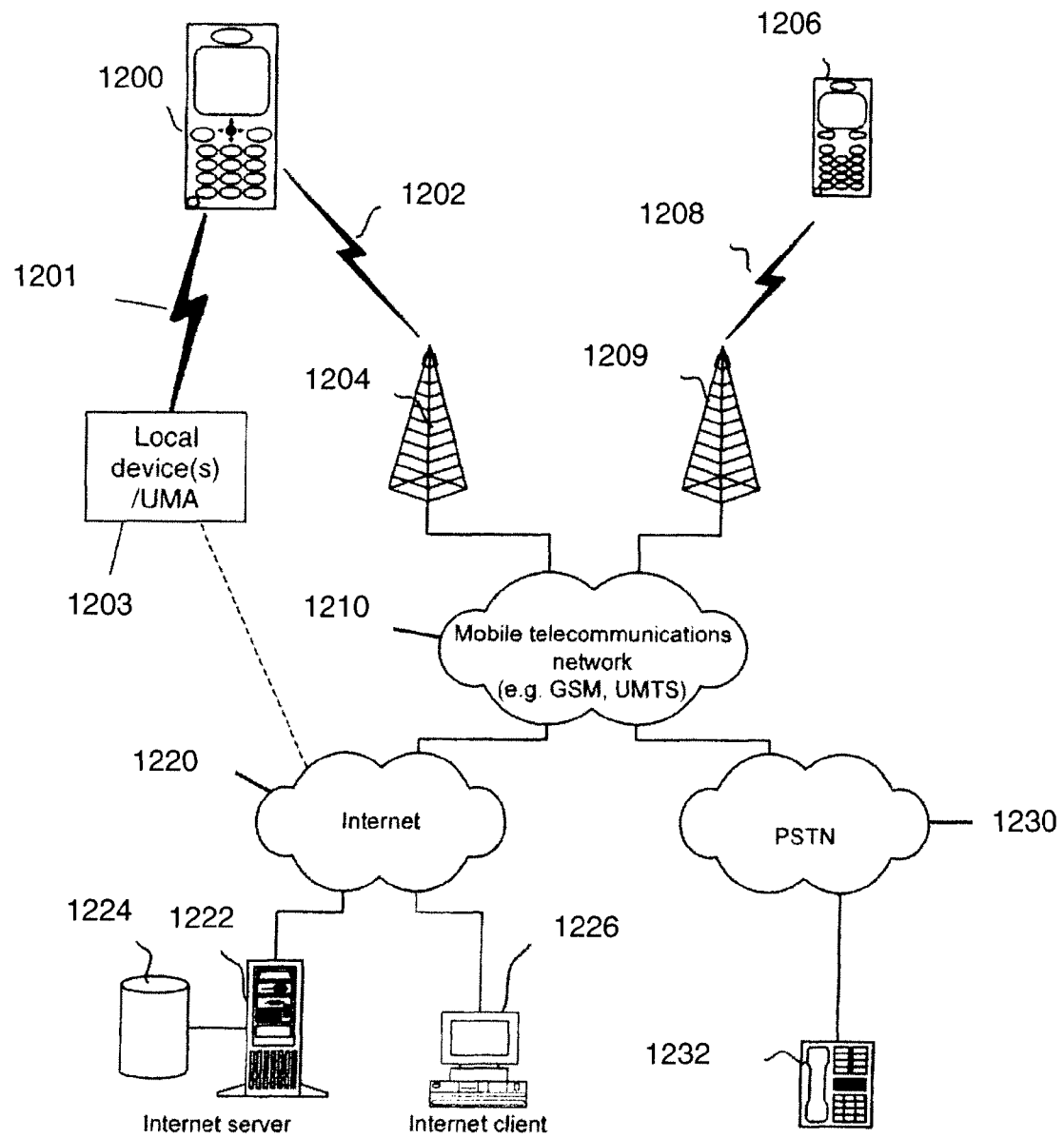
FIG. 12 is a schematic illustration of a cellular telecommunications system, as an example, of an environment in which a communications device incorporating features of an exemplary embodiment may be applied.

FIG. 12 is a schematic illustration of a cellular telecommunications system, as an example, of an environment in which a communications device 1200 incorporating features of an embodiment may be applied. Communication device 1200 may be substantially similar to that described above with respect to terminals 900. In the telecommunication system of FIG. 12, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 1200 and other devices, such as another mobile terminal 1206, a stationary telephone 1232, or an internet server 1222. It is to be noted that for different embodiments of the mobile terminal 1200 and in different situations, different ones of the telecommunications services referred to above may or may not be available. The aspects of the invention are not limited to any particular set of services in this respect.

The mobile terminals 1200, 1206 may be connected to a mobile telecommunications network 1210 through radio frequency (RF) links 1202, 1208 via base stations 1204, 1209. The mobile telecommunications network 1210 may be in compliance with any commercially available mobile telecommunications standard such as GSM, UMTS, D-AMPS, CDMA2000, FOMA and TD-SCDMA.

The mobile telecommunications network 1210 may be operatively connected to a wide area network 1220, which may be the internet or a part thereof. An internet server 1222 has data storage 1224 and is connected to the wide area network 1220, as is an internet client computer 1226. The server 1222 may host a www/hap server capable of serving www/hap content to the mobile terminal 1200.

For example, a public switched telephone network (PSTN) 1230 may be connected to the mobile telecommunications network 1210 in a familiar manner. Various telephone terminals, including the stationary telephone 1232, may be connected to the PSTN 1230.

The mobile terminal 1200 is also capable of communicating locally via a local link 1201 to one or more local devices 1203. The local link 1201 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 1203 can, for example, be various sensors that can communicate measurement values to the mobile terminal 1200 over the local link 1201. The above examples are not intended to be limiting, and any suitable type of link may be utilized. The local devices 1203 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 1200 may thus have multi-radio capability for connecting wirelessly using mobile communications network 1210, WLAN or both. Communication with the mobile telecommunications network 1210 may also be implemented using WiFi, WiMax, or any other suitable protocols, and such communication may utilize unlicensed portions of the radio spectrum (e.g. unlicensed mobile access (UMA)).

Figure 13:
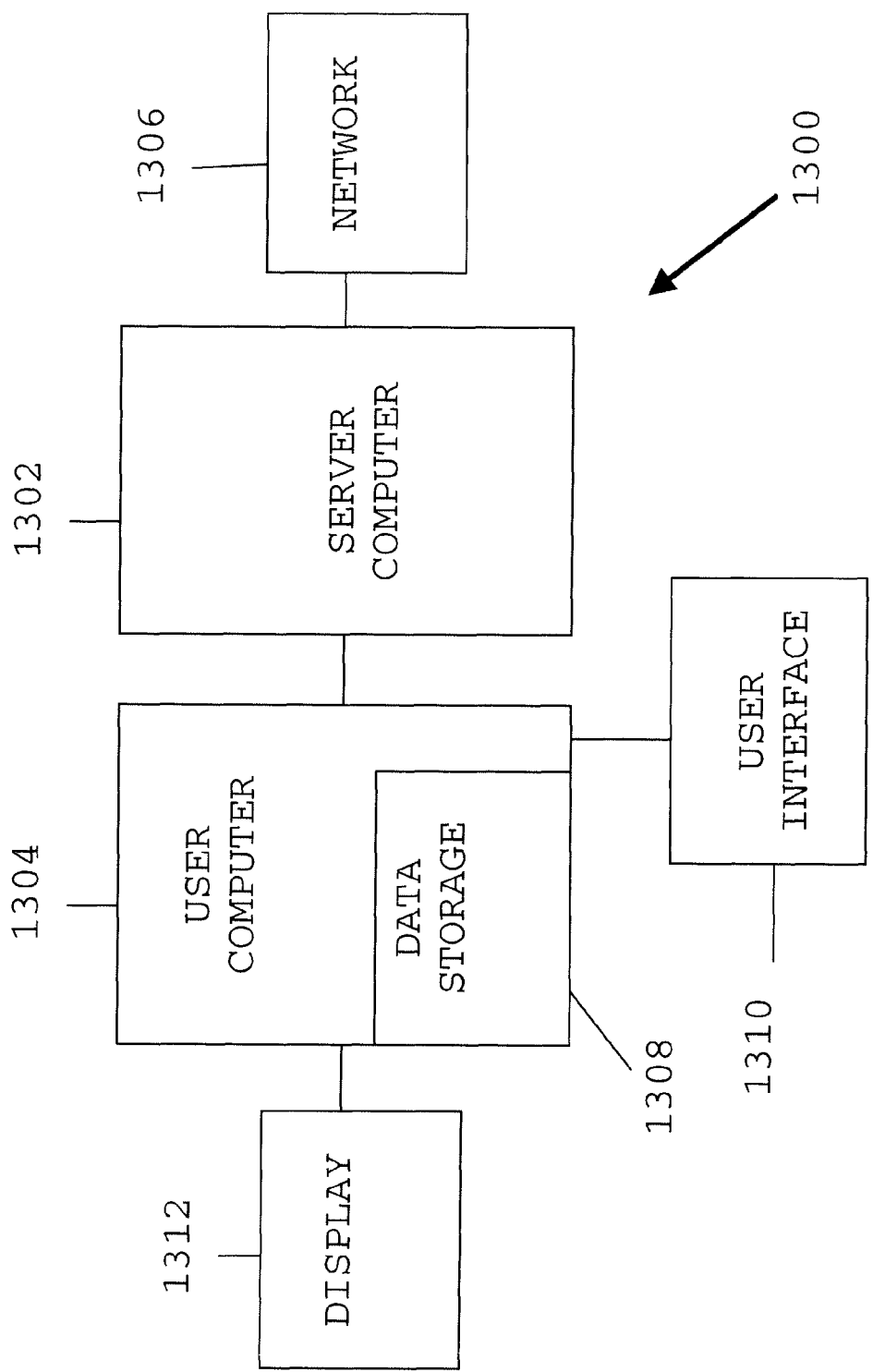
FIG. 13 illustrates a block diagram of an example of an apparatus incorporating features that may be used to practice aspects of the disclosed embodiments.

The disclosed embodiments may also include software and computer programs incorporating the process steps and instructions described herein that are executed in different computers. FIG. 13 is a block diagram of one embodiment of a typical apparatus 1300 incorporating features that may be used to practice aspects of the embodiments. As shown, a computer system 1302 may be linked to another computer system 1304, such that the computers 1302 and 1304 are capable of sending information to each other and receiving information from each other. In one embodiment, computer system 1302 could include a server computer adapted to communicate with a network 1306. Computer systems 1302 and 1304 can be linked together in any conventional manner including, for example, a modem, hard wire connection, or fiber optic link. Generally, information can be made available to both computer systems 1302 and 1304 using a communication protocol typically sent over a communication channel or through a dial-up connection on ISDN line. Computers 1302 and 1304 are generally adapted to utilize program storage devices embodying machine readable program source code which is adapted to cause the computers 1302 and 1304 to perform the method steps disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 1302 and 1304 may also include a microprocessor for executing stored programs. Computer 1302 may include a data storage device 1308 on its program storage device for the storage of information and data. The computer program or software incorporating the processes and method steps incorporating aspects of the invention may be stored in one or more computers 1302 and 1304 on an otherwise conventional program storage device. In one embodiment, computers 1302 and 1304 may include a user interface 1310, and a display interface 1312 from which aspects of the invention can be accessed. The user interface 1310 and the display interface 1312 can be adapted to allow the input of queries and commands to the system, as well as present the results of the commands and queries.

The disclosed embodiments may aid the user with the initiation of a communication by optimizing the user's contact information. For example the contact information such as home, work and cell phone numbers as well as email addresses may be associated with a particular type of communication (e.g. call, SMS, MMS, email, business card sending, etc.) in a context dependent manner. The disclosed embodiments may decrease the need for default contact information support within the device 100 as the device 100 would propose the most likely used number for a certain type of communication. Aspects of the disclosed embodiments also allow for the optimization of all communication types whereas default contact support is optimized for call handling only. The disclosed embodiments may also increase the usability of the device 100 by simplifying the communication process via a reduction in the amount of options pertaining to a user's contact list.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An apparatus comprising:
   a communication type detection unit configured to detect a type of communication of the apparatus;
   a time detection unit configured to detect a time that communications are made;
   a memory configured to record a use pattern of contact information for a respective communication type for a user, wherein the use pattern defines the time that the communications associated with the respective communication type are made; and a processor connected to the communication type detection unit, the time detection unit, and the memory, the processor being configured to:
  identify and store information related to a contact from a contact list in the apparatus,
  analyze the said information, and
  propose a contact detail associated with a contact and a communication type most likely to be used by the user to initiate communication to the contact at a current time of day based on an analyzed use pattern for the user wherein the analyzed use pattern comprises at least a frequency of use of the respective communication types of the contact and a time of day at which the respective communication types are configured to be used by the user to initiate communication with the contact as compared to the current time of day, wherein the respective communication type presented to the user through a dynamic virtual key function for the proposed contact detail changes from a first communication type, out of a plurality of communication types defined for the contact detail, to a second communication type most likely to be used.

2. The apparatus of claim 1, wherein the communication type is one of a short messaging system message, a multimedia message system message, a call, email and business card message.

3. The apparatus of claim 1, wherein the contact information includes communication numbers or communication addresses corresponding to a contact.

4. The apparatus of claim 1, wherein the processor is configured to identify and present the contact information used most for the communication type.

5. The apparatus of claim 4, wherein the processor is configured to update which contact information is identified as being used most depending on the use pattern.

6. The apparatus of claim 1, wherein the processor is further configured to:
  enable the user to select the contact from a list of contacts, and
  in response to the selection of an entry from a list of contact details, propose the communication type.

7. The apparatus of claim 6, wherein the proposed contact detail is used most for initiating communications with the selected contact through the communication type.

8. The apparatus of claim 1, wherein the apparatus is a mobile communication device.

9. The apparatus of claim 1, wherein the time detection unit is further configured to detect a day that communications are made, wherein the use pattern further defines the day that communications associated with the respective communication type are made, and wherein the analyzed use pattern further comprises a day of the week of the respective communication types of the contact as compared to a current day of the week.

10. A method comprising:
  identifying a communication type;
  detecting a time that communications are made;
  recording a use pattern for a user of a contact information for initiating communication through the communication type, wherein the use pattern defines the time that the communications associated with the respective communication type are made;
  identifying and storing information related to a contact from a contact list,
  analyzing the said information, and
  proposing a contact detail associated with a contact and a communication type most likely to be used by the user to initiate communication to the contact at a current time of day based on an analyzed use pattern for the user wherein the analyzed use pattern comprises at least a frequency of use of the respective communication types of the contact and a time of day at which the respective communication types are configured to be used by the user to initiate communication with the contact as compared to the current time of day, wherein the respective communication type presented to the user through a dynamic virtual key function for the proposed contact detail changes from a first communication type, out of a plurality of communication types defined for the contact detail, to a second communication type most likely to be used.

11. The method of claim 10, wherein the communication type is one of a short messaging system message, a multimedia message system message, a call, email and business card message.

12. The method of claim 10, wherein the contact information includes communication numbers or communication addresses corresponding to a contact.

13. The method of claim 10, further comprising identifying the contact information used most for initiating communications through the communication type.

14. The method of claim 13, further comprising updating which contact information is identified as being used most depending on the use pattern.

15. The method of claim 10 further comprising:
  enabling the user to select the contact from a list of contacts, and
  in response to the selection of an entry from a list of contact details, propose the communication type.

16. The method of claim 15, further comprising proposing the contact detail used most for initiating communications with the selected contact through the communication type.

17. The method of claim 10, wherein the contact information is accessed from an idle mode of a device.

18. The method of claim 10 further comprising detecting a day that communications are made, wherein the use pattern further defines the day that communications associated with the respective communication type are made, and wherein the analyzed use pattern further comprises a day of the week of the respective communication types of the contact as compared to a current day of the week.

19. A computer program product comprising:
  a non-transitory computer useable storage medium having computer readable code embodied therein for causing a computer to present contact information, the computer readable code in the computer program product comprising:
  computer readable program code for causing a computer to identify a communication type;
  computer readable program code for causing a computer to detect a time that communications are made;
  computer readable program code for causing a computer to record a use pattern for a user of a contact information for initiating communication through the communication type, wherein the use pattern defines the time that the communications associated with the respective communication type are made;
  computer readable program code for causing a computer to identify and store information related to a contact from a contact list in the apparatus;
  computer readable program code for causing a computer to analyze the said information; and
  computer readable program code for causing a computer to propose a contact detail associated with a contact and a communication type most likely to be used by the user to initiate communication to the contact at a current time of day based on an analyzed use pattern for the user wherein the analyzed use pattern comprises at least a frequency of use of the respective communication types of the contact and a time of day at which the respective communication types are configured to be used by the user to initiate communication with the contact as compared to the current time of day, wherein the respective communication type presented to the user through a dynamic virtual key function for the proposed contact detail changes from a first communication type, out of a plurality of communication types defined for the contact detail, to a second communication type most likely to be used.

20. The computer program product of claim 19 further comprising computer readable program code for causing a computer to detect a day that communications are made, wherein the use pattern further defines the day that communications associated with the respective communication type are made, and wherein the analyzed use pattern further comprises a day of the week of the respective communication types of the contact as compared to a current day of the week.

21. The computer program product of claim 19 further comprising:
   computer readable program code for causing a computer to enable the user to select the contact from a list of contacts, and
   computer readable program code for causing a computer to propose the communication type in response to the selection of an entry from a list of contact details.

* * * * *